United States Patent
Morley et al.

(10) Patent No.: US 9,417,866 B2
(45) Date of Patent: Aug. 16, 2016

(54) IDENTIFICATION AND ISOLATION OF INCOMPATIBLE APPLICATIONS DURING A PLATFORM UPDATE

(71) Applicant: Verizon Patent and Licensing Inc., Arlington, VA (US)

(72) Inventors: Dorothy Beau Morley, Wayland, MA (US); David A. Philbin, Arlington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/559,264

(22) Filed: Dec. 3, 2014

(65) Prior Publication Data

US 2016/0162275 A1    Jun. 9, 2016

(51) Int. Cl.
| | |
|---|---|
| G06F 9/44 | (2006.01) |
| G06F 9/445 | (2006.01) |
| H04L 29/08 | (2006.01) |

(52) U.S. Cl.
CPC ........ G06F 8/65 (2013.01); H04L 67/02 (2013.01); H04L 67/10 (2013.01)

(58) Field of Classification Search
USPC .......................................................... 717/170
See application file for complete search history.

(56) References Cited

U.S. PATENT DOCUMENTS

| | | | | |
|---|---|---|---|---|
| 2003/0167354 A1* | 9/2003 | Peppers | ............... | G06F 8/60 719/327 |
| 2004/0003266 A1* | 1/2004 | Moshir | ............... | G06F 8/65 713/191 |
| 2006/0106806 A1* | 5/2006 | Sperling | ............... | G06F 8/65 |
| 2014/0282476 A1* | 9/2014 | Ciudad | ............... | G06F 8/65 717/171 |

* cited by examiner

Primary Examiner — Hang Pan

(57) ABSTRACT

An Application ("App") Checker identifies and isolates incompatible applications on a mobile device during a software platform update. After receiving a target platform version number from an Update Server, the App Checker generates a list of installed applications on the mobile device. Next, the App Checker sends a request to an App Store Server or Update Server for an application catalog of applications compatible with the target platform version. Upon receiving the application catalog indicating compatibility status of applications relative to the target platform version, the App Checker iteratively compares the installed application list with the application catalog to identify whether or not each installed application is compatible with the target platform. The App Checker then populates an application quarantine or removal database to identify each incompatible application to isolate incompatible applications, and quarantines or removes the incompatible applications. Finally, the mobile device is upgraded to the target platform version.

20 Claims, 8 Drawing Sheets

FIG. 4A

400 App Whitelist & Blacklist Table 

| Application | Platform Version 3.0, Build 1 | Platform Version 3.0, Build 2 | Platform Version 3.1, Build 1 | Platform Version 3.2, Build 2 |
|---|---|---|---|---|
| A (Angry Birds v. 1.1.1) | Yes | No | Yes | Yes (Whitelist) |
| B (Skype v. 2.2.1) | Yes | Yes | Yes | No (Blacklist) |
| C (Facebook v. 1.5.6) | No | Yes | Yes | Yes (Whitelist) |
| N (LinkedIn v. 3.4.1) | Yes | Yes | Yes | No (Blacklist) |

FIG. 4B

420 Empirically Derived App Whitelist & Blacklist Table 

| Application | Reported Malfunctions in Platform Version 3.1, Build 1 | Reported Malfunctions in Platform Version 3.2, Build 2 | Compatible with Platform Version 3.2, Build 2 |
|---|---|---|---|
| A (Angry Birds v. 1.1.1) | 200 | 300 | Yes (Whitelist) |
| B (Skype v. 2.2.1) | 300 | 15,000 | No (Blacklist) |
| C (Facebook v. 1.5.6) | 800 | 2,000 | Greylist |
| N (LinkedIn v. 3.4.1) | 600 | 30,000 | No (Blacklist) |

FIG. 4C

440 App Quarantine or Removal Table 

| Application | Platform & Build No. | Quarantine | Remove |
|---|---|---|---|
| A (Angry Birds v. 1.1.1) | Platform Version 3.2, Build 2 | No | No |
| B (Skype v. 2.2.1) | Platform Version 3.2, Build 2 | Yes | No |
| C (Facebook v. 1.5.6) | Platform Version 3.2, Build 2 | No | No |
| N (LinkedIn v. 3.4.1) | Platform Version 3.2, Build 2 | No | Yes |

IDENTIFICATION AND ISOLATION OF INCOMPATIBLE APPLICATIONS DURING A PLATFORM UPDATE

BACKGROUND

Generally, mobile devices, such as mobile phones, tablets, etc. incorporate various software components, including mobile operating systems, such as Apple iOS®, Google Android®, Windows Phone®, and Amazon Fire iOS®. Mobile devices also embody native applications ("apps") developed by network carriers and original equipment manufacturers ("OEMs"), such as a telephony application. Typically, the mobile device operating system and native applications are preloaded on the device before sale. After purchasing the mobile device, a subscriber customizes the suite of available applications on their device by downloading and installing various third-party after-market applications through an application store, such as via Apple iTunes®, Google Play®, Windows Phone Store®, and Amazon Appstore®, or even via stand-alone websites.

Unfortunately, when platform updates to the operating system and native applications occur on a mobile device, third-party applications frequently malfunction due to incompatibilities with the upgraded platform. The previous solutions fail to adequately detect and isolate the third-party applications installed on a customized mobile device that are incompatible with a platform update. Consequently, there are many drawbacks to existing platform updating technology.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4A is an example of a database structure employed to whitelist and blacklist applications for platform version and build numbers.

FIG. 4B is an example of database structure to empirically ascertain whether an application is validated for a platform update.

FIG. 4C is an example of a database structure generated for an application quarantine or removal database as may be used in a platform update.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
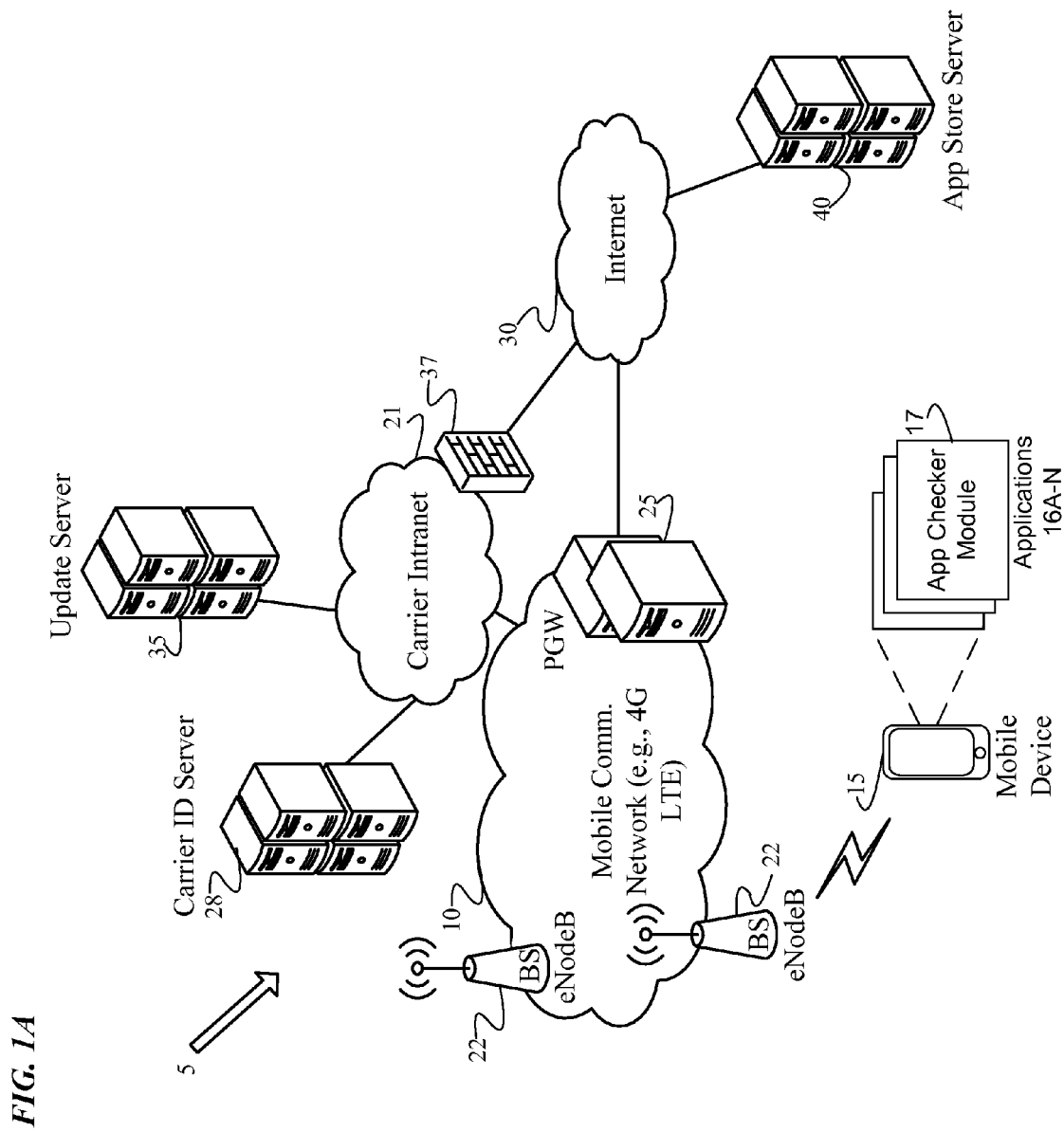
FIG. 1A is a high-level functional block diagram of an example of a system of networks and devices that provide a variety of communication services, including communications in support of identifying and isolating applications on a customized mobile device that are incompatible with a platform update.
Figure 1B:
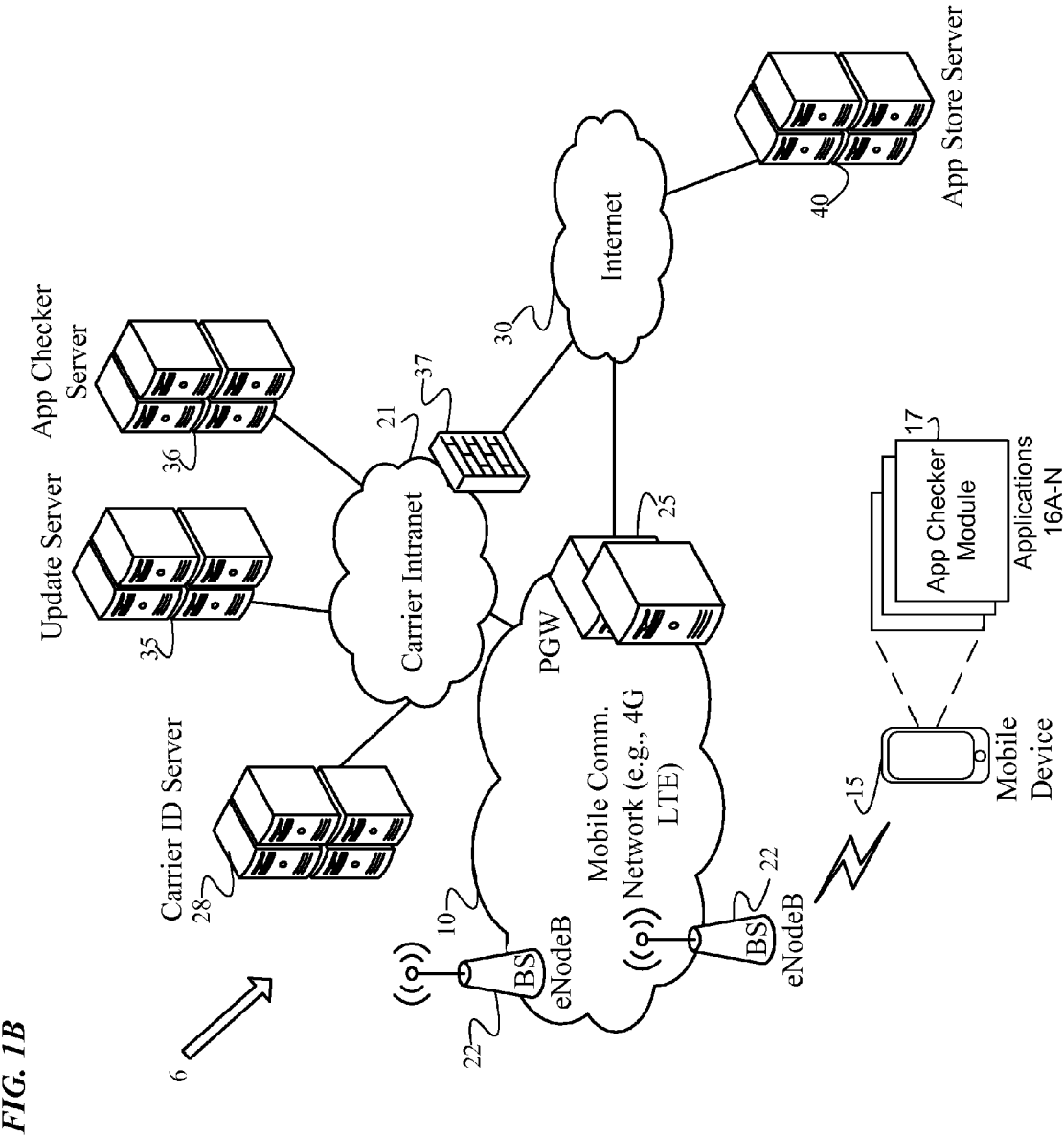
FIG. 1B is another high-level functional block diagram of an example of a system of networks and devices that provide a variety of communication services, where an App Checker Server is decoupled from an Update Server.

Reference now is made in detail to the examples illustrated in the accompanying drawings and discussed below. FIGS. 1A-B illustrate functional block diagrams of systems 5, 6 that support communications for identifying and isolating applications on a customized mobile device that are incompatible with a platform update. In the description below, the platform refers to a package of one or more software components, such as the mobile device operating system or a native application that is developed by a carrier or OEM of a mobile device. The term compatible means that when an application runs on the platform, the application functions correctly as intended by the developer of the application subject to any software bugs that occur across multiple platform versions. Hence, it should be understood that an application functions correctly when there are software bug(s) that occur independently of a particular platform version of the application. A software bug is an error, flaw, failure, or fault in the application that causes the application to produce an incorrect or unexpected result that causes the application to behave in an unintended way. If an application is found to be compatible with a platform, and identified as such, then that application is said to be whitelisted for the platform to indicate such compatibility. The term incompatible means that when an application runs on a platform, the application does not function correctly. If an application is found to be incompatible with a platform, and identified as such, then that application is said to be blacklisted for the platform to indicate such incompatibility. Where the compatibility of an application on a platform is unknown, the application is said to be greylisted.

The illustrated systems 5, 6 includes a mobile communication network 10, in this case, operated in accordance with fourth generation (4G) Long Term Evolution (LTE) standards, although other wireless networks at least supporting data and voice communications may be used. The 4G LTE mobile network 10 in the example provides mobile telephone communications as well as Internet data communication services. For example, mobile network 10 may connect to public packet-switched data communication networks such as the Internet 30 via a packet gateway (PGW) server 25. Data communications via mobile network 10 with network connected equipment, provided for a user/subscriber of mobile device 15, may support a variety of services such as communications of text and multimedia messages, e-mail, web browsing, streaming or downloading content, etc.

In our discussion, the mobile device 15 uses packet communications via a mobile network 10, Intranet 21, and the Internet 30, which typically would utilize packet transport and Internet Protocol ("IP"), including for voice calls and related communications. The mobile device 15, here, however, can utilize other networks, other forms of network transport, and/or other protocols for the relevant communications.

For example, Voice communication may involve transport via the Internet 30 using voice over Internet Protocol ("VoIP") technologies; although additional networking equipment (not shown) may be provided for separate voice transport, e.g. if the network 10 utilizes wireless communication technologies offering traditional circuit switched transport for voice telephone type services.

As shown, systems 5, 6 include a mobile device 15, shown as a smartphone, which is typically a regular mobile telephony device with a subscription to carrier provided services of network 10, including data and voice services of the mobile communications network 10. In the example, a carrier is an entity that operates a network, such as mobile network 10, and the mobile network carrier is the entity that operates network 10 to provide services to one or more mobile device(s) 15 of users/subscribers. Mobile device 15 can be a laptop, personal digital assistant ("PDAs"), smartphone, tablet computer, portable games or media players with wireless communication elements, or other portable devices designed to communicate via one or more wireless networks, including packet-switched or circuit-switched transport networks.

Mobile device 15 wirelessly connects to mobile network 10 through a cellular base station (BS) 22 to communicate, two of which appear in the drawing by way of example. The mobile device 15 in the example corresponds to a smartphone and includes a universal integrated circuit card ("UICC") with SIM credentials, such as a traditional SIM card, code division multiple access ("CDMA") subscriber identity module (collectively, "CSIM"), universal subscriber identity module ("USIM"), or IP Multimedia Services Identity Module ("IS IM"). NI").

In our illustration, the mobile device 15 engages in communications with an Update Server 35 and Application Store Server ("App Store Server") 40. The mobile device 15 makes service calls to the Update Server 35 and App Store Server 40 to determine whether a platform update is available and then requests information to determine whether applications are compatible with the platform update. As discussed below, such communications typically take place through the carrier during platform updates, as it is the carrier that is involved in pushing out or delivering platform updates to the mobile device 15. However, platform updates may take place without the carrier's involvement, and in such situations mobile device 15 may be in direct communication with the Update Server 35 and App Store Server 40 via the Internet 30 through other wireless or wired media, such as a WiFi connection (not shown). Updates without the carrier's involvement may occur, for example, when updates that are independent of the carrier are pushed out by the OEM or mobile device operating system manufacturer.

Mobile device 15 has a network communication capability and one or more physical elements for providing a user interface. Internally, mobile device 15 typically includes one or more wireless transceivers for data communication, a processor configured/connected to control device operation, a memory, and programming. As discussed more later, mobile device 15 also includes one or more physical elements for input, and is programmed or otherwise configured to perform various functions involved in the detection and isolation of applications that are incompatible with a target platform version.

In the illustration, mobile device 15 includes several applications 16A-N (representative of any number of applications). Mobile device 15 also has an App Checker module 17 installed and executes the App Checker module 17 during software platform upgrades. The applications 16A-N and App Checker module 17 are typically installed as applications after being downloaded from the App Store Server 40. Examples of App Stores include Apple iTunes®, Google Play®, Windows Phone Store®, and Amazon Appstore®. Instead of being downloaded via an App Store, the App Checker module 17 may be provided as a preloaded software component. Alternatively, App Checker module 17 can be installed or executed during the course of a platform upgrade, for example, the App Checker module 17 can be part of the software platform upgrade package installation, and execute during the pre-installation processing.

In our example, applications 16A-N and App Checker module 17 are native applications. A native application is written in a specific programming language, such as Java for the Android operating system and Objective C for the iOS operating system, to provide high reliability and performance. Native applications have access to various hardware components of mobile device 15. Web applications are written in a browser-supported programming language, such as JavaScript, HTML, etc. and run in a web browser. Typically, web applications offer good intra and cross-platform compatibility; however, web applications may also be considered as applications 16A-N in environments where compatibility across different versions of a web browser is an issue.

App Checker module 17 handles the deployment of software platform updates on the mobile device 15 of the subscriber when platform update packages become available, such as those updates involving major underlying software platform changes. Such changes can include updates to the native applications developed by the carrier and OEM of the mobile device, such as a telephony application, as well as updates to the mobile device operating system. Generally, such software components are preloaded on the mobile device 15 prior to sale to an individual, and thus are referred to herein as "preloaded software." App Checker module 17 pings or queries the Update Server 35 and requests whether a platform update is available. When a platform update is available, App Checker module 17 determines whether each of the applications 16A-N installed on mobile device 15 that are not preloaded software and not part of the software platform itself are compatible with the target platform version that is available in the update.

During the validation process, App Checker module 17 quarantines or removes applications on the mobile device 15 that are incompatible with the target platform upgrade. The term "quarantine" means to isolate an application such that the application is no longer capable of execution on the mobile device 15, but the application itself remains installed. During quarantine of the application from the mobile device 15, the executable file(s) that run the application and supporting setup and configuration files are moved to a quarantine storage area on the mobile device 15, and an application registry, for example, may be updated to direct execution of the application to the App Checker module 17. The term "remove" means to isolate an application by uninstalling the application from the mobile device 15, such that the application no longer remains installed on the mobile device 15. During removal of the application, the executable file(s) that run the application and supporting setup and configuration files are deleted from the storage of the mobile device 15, and the application is deleted from an application registry, for example.

Quarantine or removal of applications may be trigged by downloading of the target platform version and occur immediately before download of the platform version, after downloading of the target platform version but prior to installation, during the installation of the target platform version, or immediately after installation of the target platform version.

Alternatively, the quarantine and removal of applications may occur immediately upon the target platform version becoming available or a predetermined time period after the target platform version becomes available (e.g., several minutes or several hours).

Once the quarantined or removed applications become compatible with the target platform version, App Checker module 17 informs the subscriber/user of the mobile device 15 of the status change in compatibility in order to prompt enablement of a quarantined application from the quarantine list or reinstallation of a removed application. To inform the subscriber of the status change, the App Checker module 17 may display a popup window on the screen of mobile device 15 or send a text or email message to the subscriber. Alternatively, the App Checker module 17 automatically removes the application from quarantine to enable the application or automatically reinstalls the application, when the application becomes compatible with the target platform version depending on whether the subscriber selected to quarantine or remove the application. When reinstallation of a removed application is needed, the App Checker module 17 may couple the display of the popup screen with launching an application for an App Store Server 40 that directs the subscriber to the download and installation page for the removed application. To make such determinations and apprise the subscriber of the status change, the App Checker module 17 continuously monitors the whitelist and blacklist databases that are discussed below for a change to whitelist status on the target platform version. Continuously monitoring in this context means the App Checker module 17 automatically checks the compatibility status of quarantined or removed applications after a predetermined time period, such as once a day, once a week, or once a month, to determine whether there has been a change to whitelist status.

The carrier that operates the network 10 also utilizes a variety of other systems for related purposes, such as network maintenance, accounting, and provisioning. In the example, the carrier has another data network, e.g. Intranet 21, that provides data communications for other data systems used by the carrier; and that Intranet 21 has connectivity into the network 10 that provides the actual communications services to the carrier's customers/subscribers. Examples of carrier systems that reside in or communicate via the Intranet 21 include systems for maintaining account records and for processing of network usage data for billing purposes, as well as servers for subscriber identification or authentication, such as a Carrier Identification ("ID") Server 28. The Intranet 21 is connected to the Internet 30 via routing and protective gear generally represented by the firewall 37.

In the example of both FIGS. 1A-B, Update Server 35 resides on the carrier Intranet 21. The Update Server 35 is tasked with administering software updates to subscribers of the carrier, such as those updates involving software platform changes. In FIG. 1A, the Update Server 35 responds to queries from the App Checker module 17 of the mobile device 15 requesting whether a platform update is available (i.e., pinging), or alternatively automatically notifies the App Checker module 17 and then pushes such updates out when they become available or when the mobile device 15 requests the update. In FIG. 1B, the Update Server 36 still pushes such updates out when they become available or when the mobile device 15 requests the update. However, a separate App Checker Server 36 responds to queries from the App Checker module 17 of the mobile device 15 requesting whether a platform update is available (i.e., pinging), or alternatively automatically notifies the App Checker module 17.

The carrier, OEM, and developer of the mobile operating system are in a posture to seamlessly validate the correctness of preloaded software before a platform upgrade becomes available. Unfortunately, third-party applications available through the App Store Server 40 typically cannot be put through robust testing, if any testing at all, on the new platform before the platform upgrade becomes available.

To this end, the Update Server 35, as discussed below, may empirically track third-party applications that operate correctly under particular platforms, in order to provide the App Checker module 17 with up to date interoperability information relative to a target platform version. In order to achieve such functionality, Update Server 35 receives incompatibility reports transmitted from various App Checker modules 17 deployed on other mobile devices on the network 10 and collects these reports in databases to monitor instances of incompatibility of applications 16A-N on different versions of the same platform. When the target platform version is not yet installed on a sufficient number of mobile devices, such as 1,000 devices, there may be insufficient data to determine whether the application is compatible. In such a situation where the target platform version exists on less than a predetermined threshold of device installations, the Update Server 35 can indicate that the application is greylisted to the App Checker module 17. Once the number of installations of the target platform versions exceeds the predetermined threshold of device installations, the Update Server 35 determines whitelist, blacklist, or even continued greylist status, as outlined in further detail below.

Each incompatibility report identifies an application and the platform version on which the application resulted in a software bug. As discussed later in FIGS. 3 and 4B, the transmitted incompatibility reports are then analyzed by the Update Server 35 to determine which applications are incompatible on particular platforms by excluding software bugs that are independent of the platform version by comparing the received incompatibility report to historical incompatibility reports for prior platform versions. This incompatibility data is then fed back to the App Checker module(s) 17 deployed on mobile devices to ascertain whether applications should be quarantined or removed during platform upgrades. App Store Server 40 responds to service requests from the App Checker module 17, such as via an application programming interface ("API") that is specified by the App Store Server 40. In our example, the API is a series of Hypertext Transfer Protocol ("HTTP") request and response messages, usually in an Extensible Markup Language ("XML") format. For example, the App Store Server 40 checks whether one or more applications 16A-N deployed on the mobile device 15 are in the application catalog for a given platform version number and build number of a mobile operating system, such as Apple iOS®, Google Android®, and Amazon Fire iOS®.

Version numbers indicate changes, redesigns, functionality changes, patch numbers, or bug fixes to an actual software code base. Build numbers typically identify the total number of builds for an installable code release of a version. For example, while a version number may remain constant at version 1.0 for many iterations until release, a build number can uniquely identify each build until the final release. In some instances, the build number itself may be embedded in the version number, in particular, the following versioning scheme can be used: (Major Version Number)·(Minor Version Number)·(Build Number).

In an example, App Checker module 17 generates a list of installed applications 16A-N, and then makes an API call that sends a message to the App Store Server 40 to query whether each of the specific applications installed on the mobile device 15 are compatible with a target platform version and build. As part of an API request, App Checker module 17 transmits the generated list of installed applications as a parameter in the API call, such as in an Extensible Markup Language ("XML") format via Hypertext Transfer Protocol ("HTTP") and the target platform version number. This can reduce network overhead by reducing the amount of data transmitted between the App Checker module 17 and App Store Server 40. Alternatively, a general API call may be made to the App Store Server 40, in which case the App Store Server 40 returns all applications that are available and correctly operate in the target platform version.

The Update Server 35 deployed by the carrier and the App Store Server 40 as outlined above may be merged with each other or divided into further devices and servers despite their logical and physical organization in the illustration. For example, the collective functionality of Update Server 35 and App Store Server 40 may be embodied in a single server or as two separate and distinct devices. Alternatively, either server or a combined server for both functions may be implemented as multiple instances on network connected computers, e.g., in server farms.

To complete the discussion of FIGS. 1A-B, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB 22 and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G LTE type RANs, although such routing and control element(s) are generically included in the broad class of devices that may be used to implement the functionality of network 10 discussed here.

Figure 2:
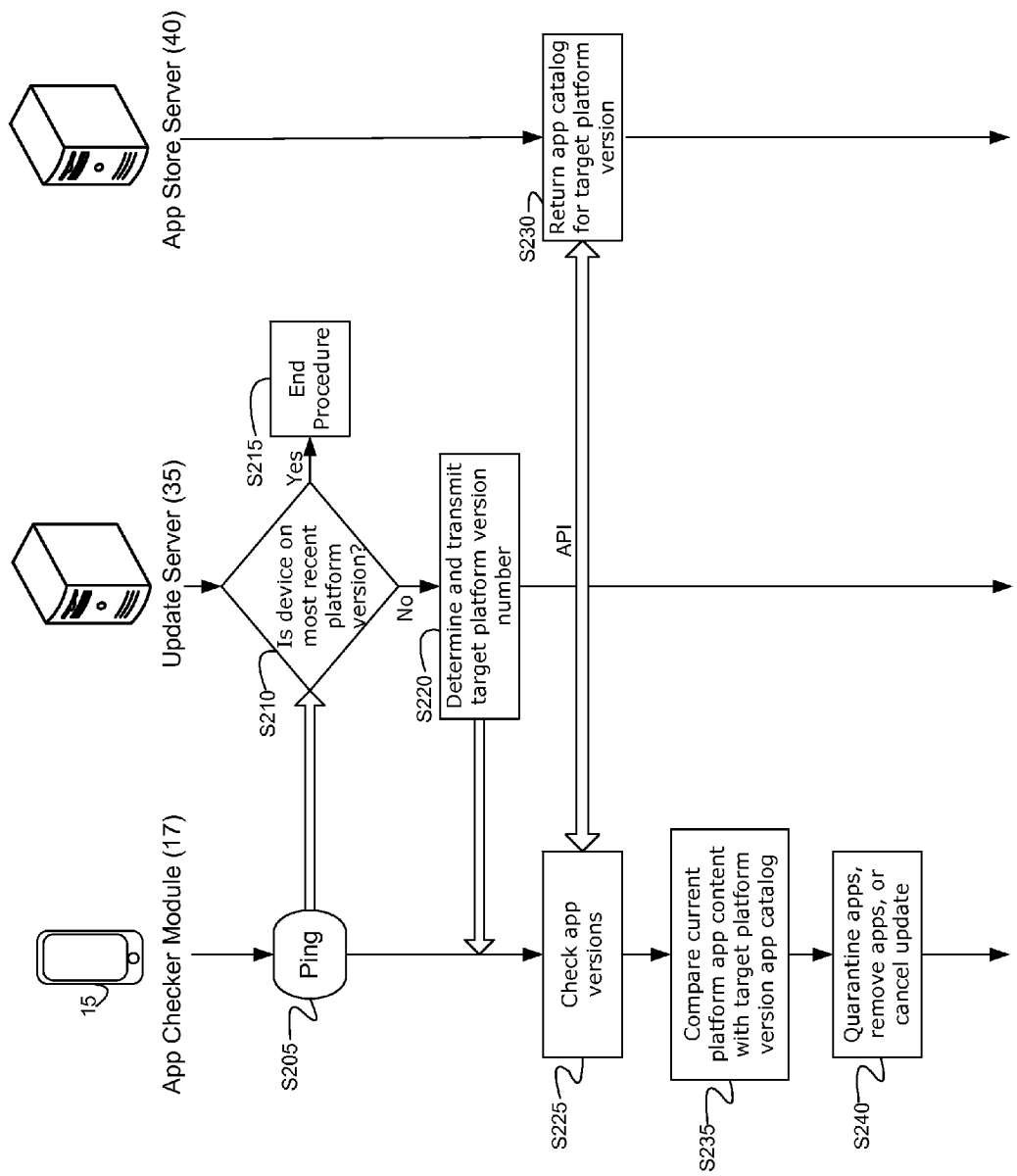
FIG. 2 is a flow chart of a procedure for finding and quarantining incompatible applications during a platform update via an application store.

FIG. 2 illustrates a procedural flow for finding and quarantining incompatible applications during a platform update via an application store. In the illustrated example, the mobile device 15 is in communication with the carrier network 10.

To initiate the procedure, in step S205, the App Checker module 17 that resides on mobile device 15 pings the Update Server 35. When pinging the server, App Checker module 17 sends a request (e.g., a message) to the Update Server 35 to ascertain (or determine) whether a new software platform version is available for the mobile device 15. As part of the request, App Checker module 17 transmits data indicating the current platform version number (or package number) for the software platform which is currently deployed on the mobile device 15. Alternatively, App Checker module 17 sends a request that seeks identification of the most recent platform version that is available for downloading on the Update Server 35.

Moving now to step S210, upon receiving the request, Update Server 35 determines whether the mobile device 15 is running the most recent platform version. This can be done by comparing the platform version number that is received from App Checker module 17 to the number for the latest platform version that is currently available for download via the Update Server 35. The target platform or target platform version is the most recent platform that is available to the mobile device 15 and the target platform version number is the version identifier of the target platform. The target platform version number is an alphanumeric identifier, for example, that identifies the target platform. As shown in step S210, if the current platform version number matches the target platform version number this means that the mobile device 15 is up to date and the procedure ends in step S215. When the procedure ends, a message is transmitted back to the App Checker module 17 to notify the subscriber of the mobile device 15 that a platform update is unavailable (not shown). On the other hand, when a new platform version is available to the mobile device 15, Update Server 35 ascertains the target platform version and transmits the target platform version number to the App Checker module 17, as shown in step S220. Of note, step S220 can occur without any request from the App Checker module 17 itself. For example, the Update Server 35 may notify the App Checker module 17 when a platform upgrade becomes available, and then push the new platform version number to the App Checker module 17 of mobile device 15.

Continuing now to block S225, after receiving versioning information regarding the target platform, App Checker module 17 generates a list of applications that are currently installed on the mobile device 15. In order to generate the list, for example, an application registry of the mobile device 15 is pulled and a list is created that includes the unique application identifier ("app ID"), such as an iOS® App ID, as well as version and build numbers of the installed applications (collectively, "application credentials"). App Checker module 17 then issues a service request via an API call to the App Store Server 40 requesting the application catalog of compatible applications for the target platform version. As a parameter in the request, the generated application list of installed applications on the current platform version with app ID, version number, and build number are transmitted to the App Store Server 40 via the API call along with the target platform version, using XML or HTTP, for example.

Proceeding now to step S230, when the App Store Server 40 receives the request to provide application information about compatibility with the target platform version, the App Store Server 40 queries accessible databases which contain whitelist and blacklist information for applications on particular platforms, specifically the target platform at issue. The whitelist and blacklist databases include tables that house a developer's certification as to whether an application is compatible with specific platform versions or empirically derived data to this effect, as shown in FIGS. 4A-B. App Store Server 40 searches the whitelist and blacklist databases for each of the applications that reside in the generated application list received from App Checker module 17 and matches each application on the generated application list with a whitelist or blacklist entry on the target platform. Based upon the search, App Store Server 40 generates a tailored catalog that lists each application identified by the app ID, version number, and build number that is compatible with the target platform. In other words, the catalog provides specific compatibility information for applications of interest to the mobile device 15. The generated catalog is subsequently returned to the App Checker module 17 in response to the request. For example, the specific catalog identifies each application in the generated application list and includes a yes or no indication as to whether each application is compatible (i.e., is whitelisted, greylisted, or blacklisted for the target platform version). Alternatively, the generated catalog can include just the whitelisted applications, just the greylisted applcations, or just the blacklisted applications.

In order to bypass the need to make any modifications to the App Store Server 40 in support of the matching effort just discussed, the App Checker module 17 may alternatively request the entire (or general) catalog of applications available for the target platform in step S225. While this will take significantly more search time for the App Store Server 40 and additional network usage to transmit the entire catalog, such a routine enables minimal, if any, modification at the App Store Server 40. In this example, the App Store Server 40 returns the entire catalog of applications that are compatible (and/or incompatible) with the target platform version in step S230. The selection of which catalog is provided may be determined by the App Checker module 17 (e.g., indicated in the request) or by the App Store Server 40 dependent on which is smaller (and indicated to the App Checker module 17 in the response). As an example, the general catalog identifies each application and possesses a yes or no designation as to whether each application is compatible (i.e., is whitelisted or blacklisted for the target platform version).

Moving now to step S235, upon receiving the target version's application catalog (either specific or general) from the App Store Server 40, the App Checker module 17 compares the currently installed platform's application content with the received target platform catalog. The generated application list of installed applications on the current platform version with app ID, version number, and build number is compared to the application catalog of the target platform version on an iterative basis to find out whether each of the currently installed applications is or is not compatible with the target platform version. When a match (or yes/whitelist hit) is found in the target version catalog indicating the application is deemed compatible with the target platform version, no further action is taken with regard to the compatible application. Alternatively, if a specific catalog is received that is already known to be specific to the list of installed applications on the mobile device 15, an iterative comparison may be unnecessary. For example, when the generated catalog includes just the blacklisted applications on the mobile device 15, immediate action may be take on those applications without any comparisons.

In contrast, if a compatibility match is not found in the target version catalog, as shown in step S240, the App Checker module 17 populates an application quarantine or removal database with the application identifying information, including the app ID, version number, build number, and a status of whether the application is affirmatively quarantined or removed. The App Checker module 17 enables the subscriber of the mobile device 15 to isolate the incompatible applications by allowing the quarantine of the application, which disables the application after the upgrade takes place, before, or during the upgrade. When the application is quarantined during the upgrade, the application is disabled after the platform upgrade is downloaded but before the platform upgrade is actually installed. In such a situation, the App Checker module 17 is executed between the downloading and installation of the platform upgrade to allow the subscriber to disable the application. Alternatively, the incompatible application can be removed (or uninstalled) after, before, or during the upgrade. In an example, the decision as to whether to quarantine or remove and thus set the status of the application to quarantined or to removed can be automated when the database is populated. For example, the default setting may be to affirmatively quarantine the application in order to expedite the platform update process; however, the default setting can be changed to affirmatively remove the application.

In another example, the subscriber may select whether to set the application status to quarantined or removed when populating the application quarantine or removal database. When the list comparison is completed, the App Checker module 17 can enable the subscriber of the mobile device 15 to select whether to quarantine or remove the application(s). Whether the subscriber chooses to quarantine or remove an application is recorded by the App Checker module 17 as the status. The subscriber may be provided options to select whether to quarantine or remove individual applications or group sets of applications (such as all applications) for the selected quarantine or removal.

When an application is isolated, the application has been quarantined or removed. The status of whether the application is quarantined or removed may also be used to notify the subscriber of the mobile device 15 when the isolated application becomes compatible with the target platform version. By tracking such information, App Checker module 17 can subsequently indicate that the isolated application should be taken off the quarantine list (enabled again) or taken off the removal list (reinstalled again) when the application becomes compatible with the upgraded platform. After populating the quarantine or removal database, App Checker module 17 upgrades the mobile device 15 to the target platform version. During the platform upgrade process, the target software platform package is downloaded and then installed in order to deploy updates to the native applications or mobile device operating system developed by the carrier or OEM of the mobile device. Alternatively, the App Checker module 17 allows the subscriber to cancel the platform upgrade altogether if compatibility of particular application(s) are important enough to justify the maintenance of the current platform version. If the subscriber decides to cancel the platform upgrade altogether, the App Checker module 17 maintains the list of applications populated in the application quarantine or removal database for the target platform version. Subsequently, the App Checker module 17 informs the subscriber of a status change in compatibility status (e.g., change to whitelist status) of each of the applications populated in the application quarantine or removal database by displaying a popup window on the screen or sending a text or email message to the subscriber. The popup window or text or email message prompt the subscriber to reinitiate the installation of the target platform version. In addition, the App Checker module 17 automatically removes an application from the list of the applications populated in the application from quarantine or removal database when the application becomes compatible with the target platform version.

Figure 3:
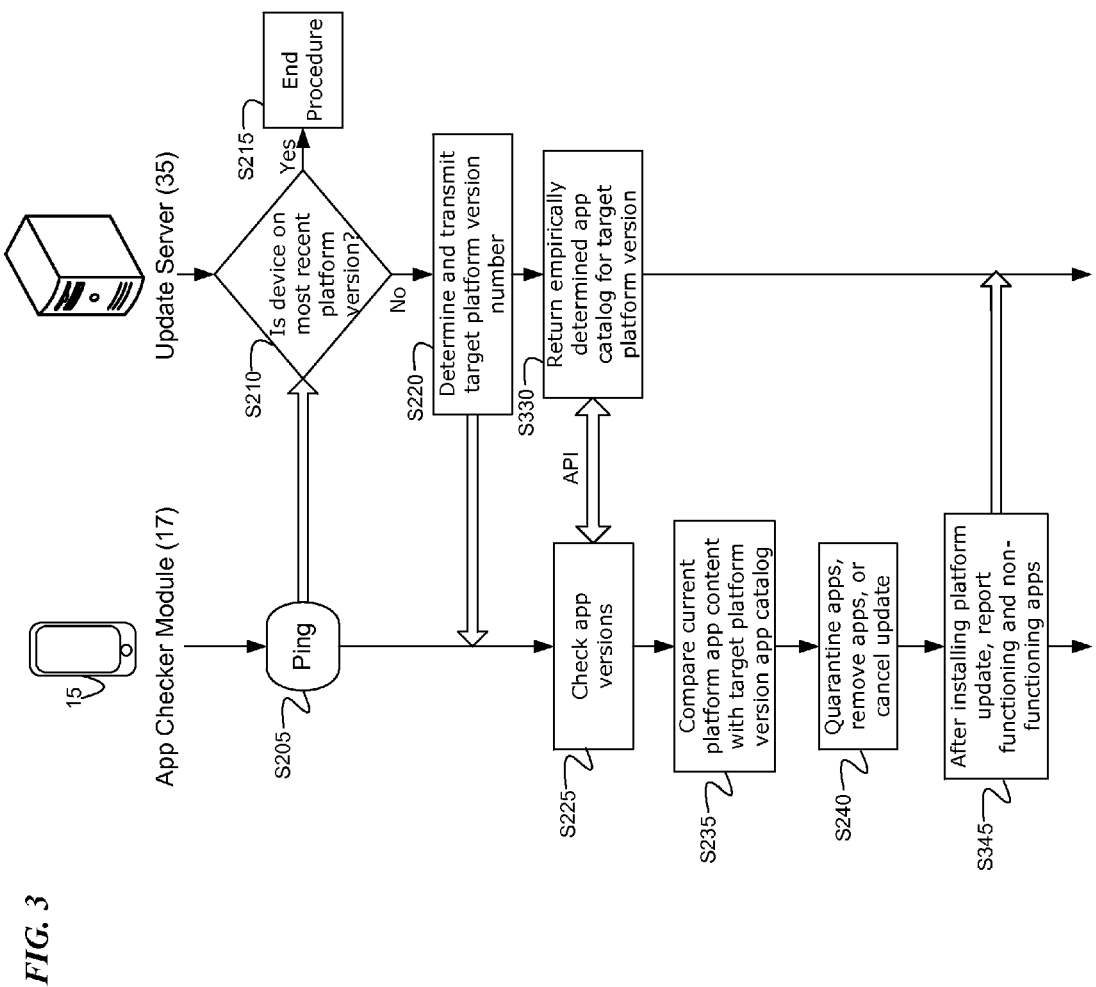
FIG. 3 is a flow chart of an empirically-based procedure for validating and quarantining applications when a platform update occurs.

FIG. 3 is a procedural flow for validating and quarantining applications based on empirically generated compatibility data during a platform update. In the example of FIG. 3, all of the steps proceed in the same manner as the corresponding numbered steps in FIG. 2 with two exceptions: steps S330 and S345. The salient points of the example in FIG. 3 occur in steps S330 and S345.

In step S330, the App Store Server 40 is not involved in the process of determining compatibility information. This is because the developer-provided whitelist and blacklist certification tables (see FIG. 4A) are not available as they would be in an App Store Server 40 environment. Consequently, the Update Server 35 generates and uses empirically derived whitelist and blacklist certification tables (see FIG. 4B) to decide whether the applications in the list generated by the App Checker module 17 are interoperable with the target platform version. As shown in step S330, the Update Server 35 receives a direct API service call from the App Checker module 17 requesting the catalog of compatible applications for the target platform version. Although not shown, the Update Server 35 may alternatively intercept and redirect to itself an API service call that App Checker module 17 initiates to the App Store Server 40 requesting the compatible applications catalog for the target platform version.

Parameters in the API request that are received by the Update Server 35 in step S330 include the generated application list of installed applications on the current platform version with app ID, version number, and build number. These parameters are transmitted to the Update Server 35 along with the target platform version via the API call, using XML or HTTP, for example. Upon receiving the request to provide application compatibility information in connection with the target platform version, the Update Server 35 queries accessible databases that contain empirically derived whitelist and blacklist information for applications on particular platforms, including the target platform at issue. The databases empirically track third-party applications that operate correctly under particular platforms and those applications that operate erroneously, in order to provide feedback to the App Checker module 17 on the whitelist, greylist, or blacklist status of applications.

The crowd-sourced incompatibility data that is collected is queried by the Update Server 35. The Update Server 35 searches the empirically derived whitelist and blacklist databases for each of the applications that reside in the generated application list that was received from App Checker module 17. The empirically derived database tables contain the number of incompatibility reports or malfunction reports of an application by app ID, version number, and build number and are linked to a specific target platform number. Along with the reported incompatibility reports is a running count (i.e., tally) of the total incompatibility incidents alongside a whitelist or blacklist status which indicates whether the application is compatible (see FIG. 4B) with a given platform. The empirically derived compatibility (i.e., whitelist or blacklist) status is continuously monitored and updated by the Update Server 35, as discussed in step S345 below. Continuously monitoring in this context means the Update Server 35 updates the number of malfunction reports as the reports are received in real time or in near real time, and then adjusts the empirically derived compatibility status based on a threshold value of malfunction reports, as explained in S345 below. For purposes of step S330, once this compatibility status is retrieved during the search of the empirically derived database, the Update Server 35 processes and returns that status as a part of a specific or general application catalog to the App Checker module 17 in the same manner that was discussed in step S230 of FIG. 2 above.

In step S345, after installation of a target platform has completed, the App Checker module 17 continues to monitor the behavior of installed applications on the target platform. When there is an incident where an application crashes or does not perform correctly, a malfunction report is generated and sent to the Update Server 35. The malfunction report includes the platform version number on which the application malfunctioned and application identifying information, including app ID, build number, and version number. A database is used by the Update Server 35 to house each malfunction report in a separate malfunction report database. This database (not shown in FIGS. 4A-C) includes a table with the platform version number on which the application malfunctioned and application identifying information, including app ID, build number, and version number. Each time a malfunction report is received, the Update Server 35 updates the malfunction report database with a new entry to reflect the report and adjusts the malfunction tally and compatibility (e.g., whitelist or blacklist) status entries for the given application on the given platform version in the empirically derived app whitelist and blacklist table (see FIG. 4B).

As explained above, the empirical data is derived from report transmissions from various App Checker modules 17 that are deployed on other (e.g., different) mobile devices throughout the network 10. These malfunction report transmission statistics are collected in a database by Update Server 35 to record instances of incompatibility of specific applications with one or more particular platforms or platform versions. As incompatibility reports are continuously received, Upgrade Sever 35 monitors and updates the empirically derived whitelist and blacklist databases with the tally of reported malfunctions and revises (or adjusts) the whitelist/blacklist status of the application(s) running on particular platforms.

To determine whether an application is compatible (i.e., whitelisted status) or incompatible (i.e., blacklisted status), the Update Server 35 compares the number of reported malfunctions with a threshold value of malfunction reports (e.g., 5,000 reported malfunction reports) and a threshold value of total number of installations of the application on the platform version (e.g., 10,000 total installations). If both numbers exceed the threshold value, the application is deemed incompatible. Alternatively, the applications may be deemed incompatible if the number of malfunction reports as a fraction or percentage of the total number of installations of the application on the platform version exceeds a threshold (e.g., ⅕ or 20% defectivity rate). Because a small number of installations of the application may skew easily, it is advantageous to have multiple thresholds that depend on the number of installations of the application. In one example, for less than 5,000 installations the threshold is 30%, for less than 10,000 installations the threshold is 20%, for less than 50,000 installations the threshold is 10%, and for less than 100,000 installations the threshold is 5%. In yet another example, for less than 5,000 installations the threshold is 50%, for less than 10,000 installations the threshold is 25%, for less than 50,000 installations the threshold is 10%, and for less than 100,000 installations the threshold is 5%.

In yet another example, the number (e.g., count or tally) of malfunction reports of the target platform version may be compared with the current platform version that precedes the target platform version. If the target platform malfunction report tally (i.e., count) exceeds the current platform version tally or is above a certain multiple (e.g., is five times or more) of the malfunction report tally of the preceding version, the application may be deemed incompatible. Consequently, the compatibility status (i.e., whitelist or blacklist status) as shown in column 437 of the table 400 in FIG. 4B is updated or adjusted based on this threshold analysis and a table like that shown in FIG. 4A can be generated or updated accordingly.

Ranges of values instead of a single threshold value may be employed to tier the applications into three separate compatibility lists: whitelist, greylist, or blacklist (see FIG. 4B). For example, less than 1,000 reported malfunction reports (e.g., a lower threshold) indicates the application is whitelisted, between 1,001-5,000 reported malfunctions (e.g., intermediate threshold) indicates the application is greylisted, and greater than 5,000 malfunction reports (upper threshold) indicates the application is blacklisted. Under this approach, when an application is greylisted the App Checker module 17 can leave the decision of whether to quarantine or remove the application to the user, or a setting can be adjusted to treat a greylisted application as whitelisted or blacklisted, depending on the suscriber's or carrier's preference.

FIG. 4A is an example of a database structure employed to whitelist and blacklist applications for platform version and build numbers. With reference to FIG. 4A, the app whitelist & blacklist table 400 contains applications A-N (representative of any number of applications) with app IDs listed as A-N. Although shown in the same table column 405 as the application name, version number, and build number, the app ID (e.g., A) actually serves as the primary key and is thus stored in a separate column from the application name (e.g., Angry Birds), version number (e.g., 1.1), and build number (the numeral 1 following the version number 1.1). In addition, the application name, version number, and build number can also be housed in separate table columns. The app ID along with the application name, version number, and build number uniquely identify each application in order to store compatibility information at a fine level of granularity. As shown in column 410, app ID A is compatible (whitelisted) with current platform version 3.1, build 1. As shown in column 415, app ID A is also compatible with target platform version 3.2, build 2.

While column 410 shows that app ID B is compatible with current platform version 3.1, build 1, column 415 shows that app ID B is incompatible (blacklisted) with target platform version 3.2, build 2. The type of database table 400 illustrated is accessible by at least App Store Server 40. App Store Server 40 and Update Server 35 typically retrieve data from table 400 to provide compatibility status information to App Checker module 17. App Store Server 40 writes to the table 400 when a developer makes a certification to whitelist/blacklist his application. Alternatively, Update Server 35 can generate the table 400 based on the threshold analysis of an empirical database of the type discussed below.

FIG. 4B is an example of database structure to empirically ascertain whether an application is validated for a platform update. The type of database table 420 illustrated is accessible by at least Update Server 35. In the illustration, the description and structure of column 425 is identical to that of column 405 in FIG. 4A. Shown in column 430 is a tally of the reported number of malfunctions in platform version 3.1, build 1 for app IDs A, B, C, N and column 435 shows the tally of reported malfunctions in platform version 3.2, build 2 for applications A, B, C, N. In one example, app ID A was reported to malfunction 200 times in version 3.1, build 1; whereas, in version 3.2, build 2, there are a reported number of 300 incidents of malfunctioning for app ID A. While column 430 shows that app ID B malfunctioned 300 times in version 3.1, build 1, column 435 indicates that app ID B malfunctioned 15,000 times in version 3.2, build 2. As discussed above, the number of malfunction reports are collected and then compiled into the table 420 for specific platform versions to amass empirical evidence of compatibility. Based on the collected empirical evidence, the threshold analysis above is effectuated and the compatibility determination is made. In this instance, the threshold analysis has found that app ID A is compatible (whitelisted) with platform version 3.2, build 2; in contrast, app ID B has been found to be incompatible (blacklisted) as indicated in column 437. Moreover, the threshold analysis has determined that app ID C is greylisted for platform version 3.2, build 2.

FIG. 4C is an example of a database structure generated to quarantine and remove applications during a platform update. The type of database table 440 illustrated is accessible by at least App Checker module 17. In the illustration, the description and structure of column 440 is identical to that of column 405 in FIG. 4A.

Shown in column 450 is the target platform update version and build information numbers for the update at issue, which is now the currently deployed platform version on the mobile device 15. Although only one platform version and build number is illustrated in column 450, past instances of application incompatibility with previous platform upgrades is continuously tracked, but not shown. Column 455 indicates whether the particular application was quarantined when the corresponding platform and build version was installed on the mobile device 15. Column 460 likewise indicates whether the application was removed when the corresponding platform and build version was installed on the mobile device 15.

As discussed above, App Checker module 17 periodically communicates with the Update Server 35 and/or App Store Server 40 to monitor whether the app IDs A-N in the table 440 have become compatible with the currently deployed platform version on mobile device 15. In this instance, the App Checker module 17 automatically (or repeatedly) sends a monitoring request to query whether app ID B and app ID N are compatible with platform version 3.2, build 2 over various time intervals, which can be set by the subscriber on the App Checker module 17. The time intervals can be set to a day, a week, a month, and a year, for example. Alternatively, updates on the compatibility status of applications may be pushed out by the Update Server 35 or App Store Server 40 to the App Tracker 17. By tracking quarantine or removal information, table 440 can advantageously be used to enable App Tracker 17 to enable an application that becomes newly compatible by removing the application from the quarantine column 455 or prompting the subscriber to reinstall the application based on the entry in the removal column 460.

Figure 5:
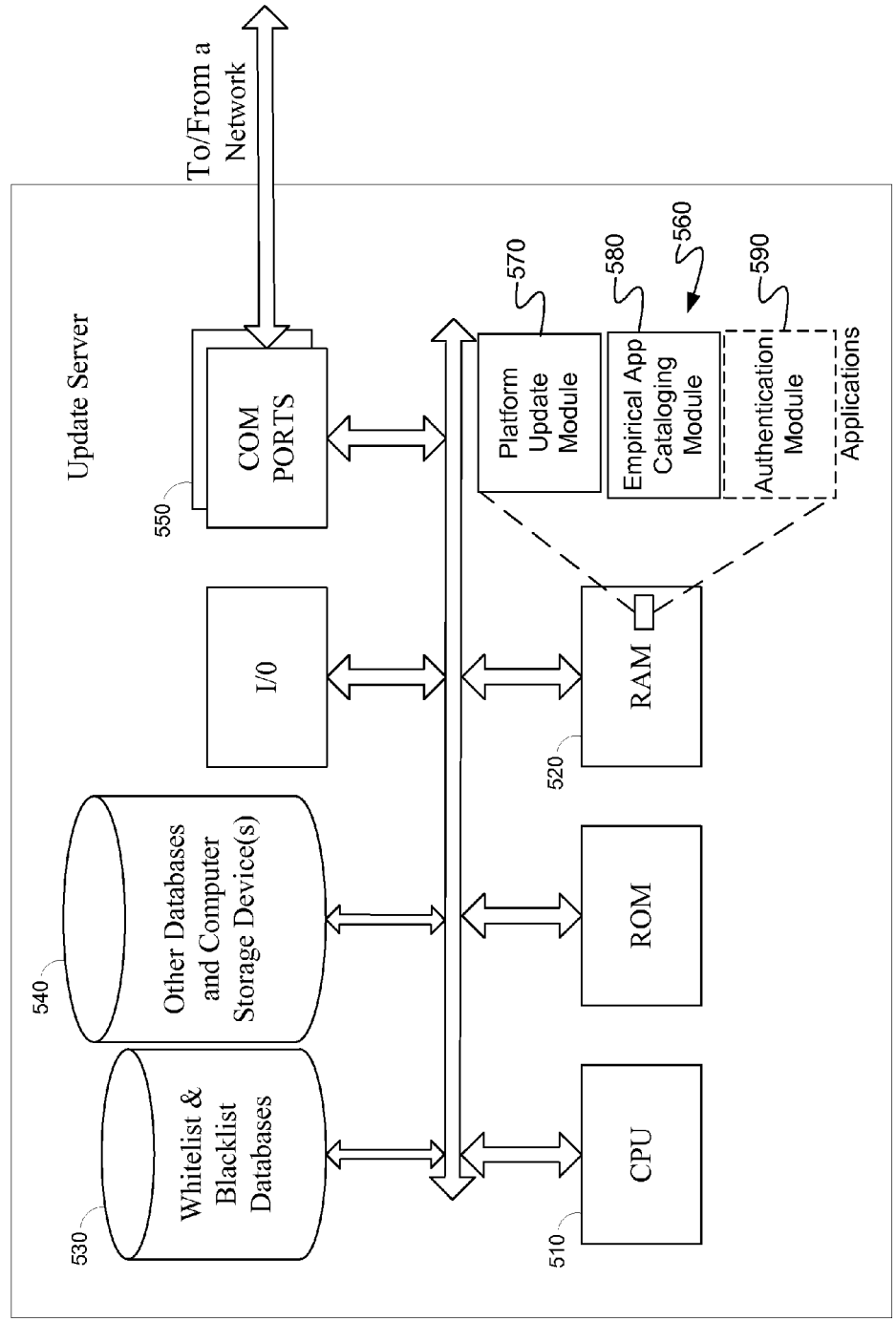
FIG. 5 is a simplified functional block diagram of a computer that may be configured as a server or host to function as any of the computer devices in FIGS. 1A-B, for example, the Update Server shown in the system of FIGS. 1A-B.

FIG. 5 is a simplified functional block diagram of a computer that may be configured as a server or host to function as any of the computing devices in FIGS. 1A-B, for example, the Update Server 35 shown in the systems 5, 6 of FIGS. 1A-B. App Store Server 40 and App Checker Server 36, for example, may run on hardware similar to that of FIG. 5.

The Update Server 35 includes a CPU 510, in the form of one or more processors, for executing program instructions. Although the processor(s) forming the CPU 510 may be similar to the microprocessor used in the mobile device 15 of FIG. 6, host or server computer devices typically use somewhat different circuit architectures, e.g. to provide more processor power. Update Server 35 also includes a memory 520, shown as RAM, which is accessible to the processor to execute various programming instructions. The memory 520 typically stores programming, such that execution of the programming by the processor 510 configures the Update Server 35 to perform the functions or procedures as described above. The server typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the Update Server 35 is shown as including the whitelist and blacklist databases 530 discussed earlier. The whitelist and blacklist databases 530 are accessible to the central processing unit (CPU) 510 of the Update Server 35. Additional databases and computer storage device(s) 540 are also accessible, such as those storing application malfunction reports, etc.

As outlined earlier, the identification and isolation of incompatible applications during platform upgrades that is effectuated by Update Server 35 involves determining platform versions and can also entail empirically tracking application whitelist and blacklist status in database 530. The exchanged data may be obtained in several different ways, including from App Checker module 17 on a mobile device 15 and App Store Server 40.

For packet data communication, Update Server 35 includes a data/network communication interface, shown generally as com ports 550. The com ports 550 may use any available data communication technology. In a fixed installation, for example, the com ports 550 may include an Ethernet interface card for communication over appropriate data network wiring. For a wireless implementation, the com ports 550 may include a WiFi transceiver. The com ports 550 allow the Update Server 35 to communicate with other devices and systems, such as App Checker module 17 on a mobile device 15 and App Store Server 40.

In the illustration, Update Server 35 includes several applications 560 stored in RAM 520. Specifically, Update Server 35 includes a platform update module 570, empirical app cataloging module 580, and authentication module 590. In general, the term "module," as used herein, refers to logic embodied in hardware or software instructions, which can be written in a programming language, such as Java™, C, C++, for example. A software module can be compiled into executable programs or written in interpreted programming languages, such as Perl or Visual Basic script. Software modules may be callable from other modules. Generally, the modules described herein refer to logical modules that may be merged with other modules or divided into sub-modules despite their physical organization. The modules can be stored in any type of computer readable medium or computer storage device and be executed by one or more general purpose computers. In addition, the methods and processes disclosed herein can alternatively be embodied in specialized computer hardware or an application specific integrated circuit ("ASIC").

The platform update module 570 is tasked with administration of mobile device platform updates, including handling platform upgrade requests and notifying mobile devices that platform updates are available, as well as determining target platform version numbers for mobile devices. Empirical app cataloging module 580 performs the empirical application/platform compatibility analysis discussed earlier. The authentication module 590 determines whether the subscriber of a mobile device has the requisite permissions to receive a platform upgrade, for example, by confirming that the mobile device is subscribed to the carrier network 10.

Figure 6:
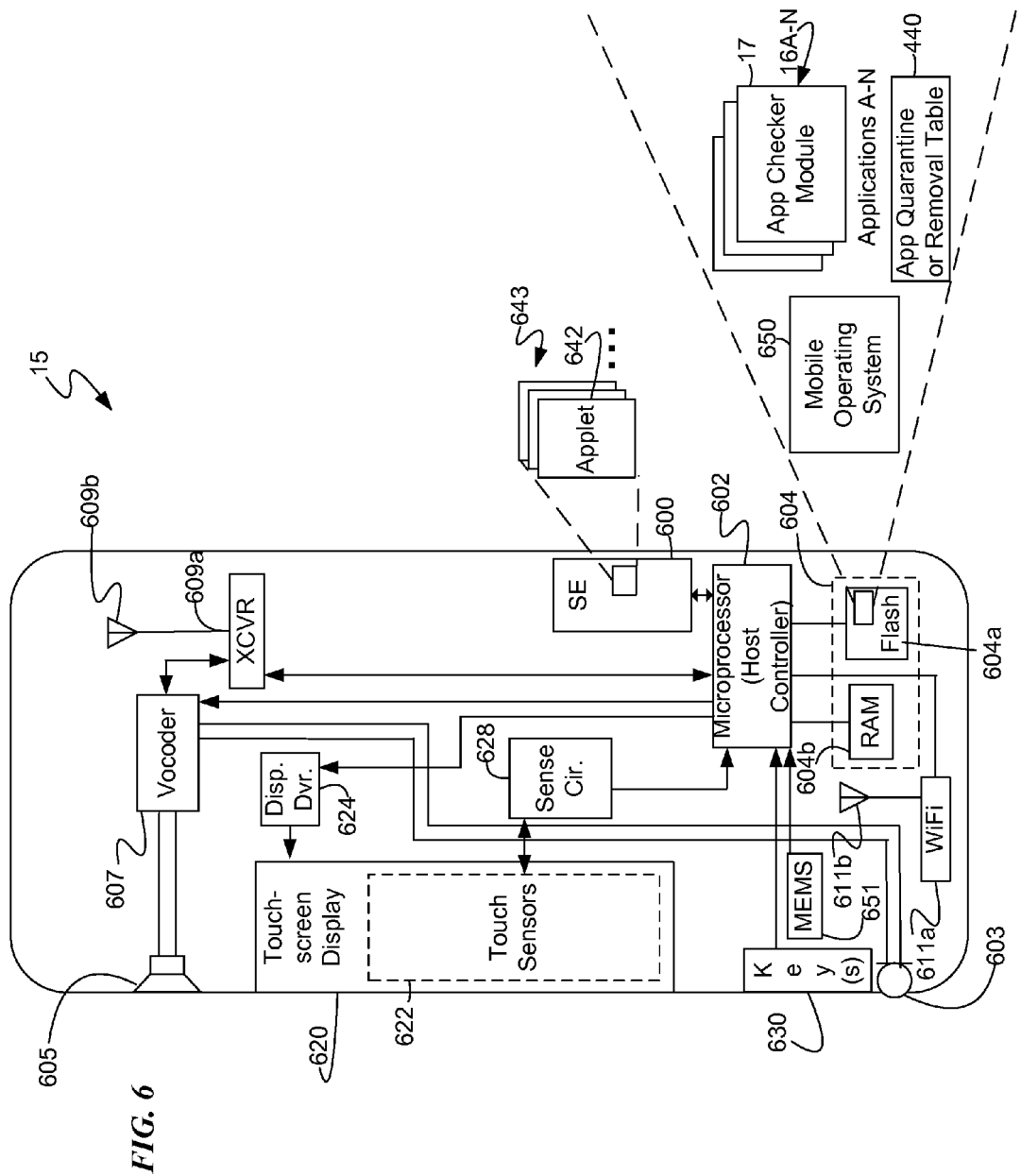
FIG. 6 is a high-level functional block diagram of a mobile device that communicates via the system of FIGS. 1A-B.

FIG. 6 is a high-level functional block diagram of an example of a mobile device in the system of FIGS. 1A-B. Shown are elements of a touch screen type of mobile device 15 having the App Checker module 17 loaded, although other non-touch type mobile devices can be used in the application compatibility detection and isolation during platform update operations under consideration here. Examples of touch screen type mobile devices that may be used include (but are not limited to) a smart phone, a personal digital assistant (PDA), a tablet computer or other portable device with biometric sensing capability. However, the structure and operation of the touch screen type devices 15 is provided by way of example; and the subject technology as described herein is not intended to be limited thereto. For purposes of this discussion, FIG. 6 therefore provides a block diagram illustration of the example of mobile device 15 having a touch screen display for displaying content and receiving user input as (or as part of) the user interface.

Although the activities that are the focus of discussions here involve data communications, a typical mobile device also support voice communications. Hence, in the example shown in FIG. 6, mobile device 15 includes a microphone 603 for audio signal input and a speaker 605 for audio signal output. The microphone 603 and speaker 605 are communicatively coupled to a voice or audio encoder/decoder (vocoder) 607. For a voice telephone call, for example, the vocoder 607 provides two-way conversion between analog audio signals representing speech or other audio and digital samples at a compressed bit rate compatible with the digital protocol of wireless telephone network communications or voice over packet (e.g., Internet Protocol) communications.

Also, as shown in FIG. 6, the mobile device 15 includes at least one digital transceiver (XCVR) 609a, for digital wireless communications via a wide area wireless mobile communication network, although the device 15 may include additional digital or analog transceivers (not shown). The transceiver 609a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 609a provides two-way wireless communication of information including digitized audio signals, still image and/or video signals, web page information for display as well as web related inputs, and various types of mobile message communications to/from the mobile device 15.

Several of these types of communications through the transceiver 609a and a network, as discussed previously, relate to protocols and procedures in support of identifying and isolating incompatible applications when a software platform update takes place. Such communications, for example, may utilize IP packet data transport utilizing the digital wireless transceiver (XCVR) 609a and over the air communications to and from a base station 22, the traffic portion of network 10, the Intranet 21 to and from the Update Server 35 and App Store Server 40 shown in FIGS. 1A-B.

In one example, the transceiver 609a also sends and receives a variety of signaling messages in support of various voice and data services provided by a network of a wireless service provider, to user(s) of mobile device 15 via the mobile communication network 10. Transceiver 609a connects through radio frequency (RF) send-and-receive amplifiers (not shown) to an antenna 609b. Transceiver 609a may also support various types of mobile messaging services, such as short message service (SMS), enhanced messaging service (EMS), and/or multimedia messaging service (MMS). Although communications involving data for incompatible application identification and isolation during platform updates typically utilize IP data transport, such communications may at times utilize one or more of these mobile messaging services for the data transport of some or all of the relevant data through the mobile communication network 10.

Many modern mobile device(s) 15 also support wireless local area network communications over WiFi, instead of or in addition to data communications using the wide area mobile communication network. Hence, in the example of FIG. 6, for packet data communications, device 15 may also include a WiFi transceiver 611a and associated antenna 611b. Although WiFi is used here as the example, the transceiver 611a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 611a, for example, may provide two-way data transport for wireless communication with a wireless access point in a residence or enterprise that the user frequents or with any available hotspot offered in a public venue. A WiFi access point, (not shown in FIGS. 1A-B), communicates with compatible user equipment, such as the device 15, over the air using the applicable WiFi protocol. The WiFi access point provides network connectivity, usually to the public Internet 30. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 611a supports various types of data communications similar to the packet data communications supported via the mobile network transceiver 609a, including communications related to communications to and from Update Server 35 and App Store Server 40 and the other devices shown in FIGS. 1A-B.

Although not separately shown, other transceivers may be included for short range communication, e.g., in accordance with the Bluetooth standard or Near Field Communication ("NFC").

The mobile device 15 further includes a microprocessor, sometimes referred to herein as the host controller 602. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 602, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in mobile device 15, Update Server 35 (e.g. FIG. 5), App Store Server 40, carrier devices and server computers, network elements, etc.

Returning more specifically to the mobile device 15 example of FIG. 6, the microprocessor 602 serves as a programmable host controller for device 15 by configuring device 15 to perform various operations, for example, in accordance with instructions or programming executable by processor 602. For example, such operations may include various general operations of the device 15, as well as operations related to communications with Update Server 35 and App Store Server 40. Although a processor may be configured by use of hardwired logic, typical processors in mobile devices are general processing circuits configured by execution of programming.

The mobile device 15 includes a memory or storage system 604, for storing data and programming. In the example, the memory system 604 may include a flash memory 604a and a random access memory (RAM) 604b. The RAM 604b serves as short term storage for instructions and data being handled by the processor 602, e.g. as a working data processing memory. The flash memory 604a typically provides longer term storage.

Hence, in the example of mobile device 15, the flash memory 604a is used to store programming or instructions for execution by the processor 602. Depending on the type of device, the device 15 stores and runs a mobile operating system 650 through which specific applications 16A-N, 17 may be run on the device. Examples of mobile operating systems 650 include Google Android, Apple iOS (I-Phone or iPad devices), Windows Mobile, Amazon Fire OS, RIM BlackBerry operating system, or the like. Flash memory 604a may also be used to store mobile configuration settings for different mobile applications or services executable at device 15 using processor 602. Flash memory 604a also stores databases, such as application quarantine or removal table 440. In the illustration, the mobile operating system 650 or one more one or more of applications 16A-N comprise the software platform of the mobile device 15.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with finding and isolating incompatible applications during a platform upgrade on mobile device 15. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 604a, 604b of memory system 604, or a memory of a computer used to download or otherwise install such programming into the mobile device, or a transportable storage device or a communications medium for carrying program for installation in the mobile device 15.

In the example, the flash memory 604a stores a number of applications 16A-N for execution by the microprocessor-based host controller 602, typically through operation/execution of the device operating system. Of note, for purposes of the present discussion, the flash memory 604 stores an App Checker module 17 as one of the programs 16A-N for execution by the microprocessor 602. App Checker module 17 can be downloaded from an application store. In another example, the App Checker module 17 may be installed as part of enrollment with the mobile carrier network 10, activation on the network 10, or pre-installed/pre-loaded on the mobile device 15 at manufacture. Alternatively, App Checker module 17 can be downloaded and installed when a platform update occurs from the Update Server 35.

In the example, execution of the App Checker module 17 by the microprocessor 602 configures mobile device 15 to perform a variety of functions, particularly handling the deployment of software updates on the mobile device 15 of the subscriber when platform update packages become available, such as those updates involving major underlying software platform change(s). In addition, App Checker module 17 of mobile device 15 determines whether the suite of available applications as customized on mobile device 15 are compatible with the target platform that is available in the update package. During the application validation process, App Checker module 17 quarantines or removes applications on the mobile device 15 that are incompatible with the target platform upgrade. When the quarantined or removed applications become compatible with the target platform, App Checker module 17 informs the subscriber of the mobile device 15 of the status change in compatibility. A quarantined application may then be taken off the quarantine list to enable the quarantined application. A removed application may be taken off the removal list and the subscriber/user may be prompted to reinstall the removed application by launching an App Store application and preselecting the removed application for installation. Of note, App Checker module 17 can automatically enable a quarantined application or automatically reinstall a removed application, that is, without requesting permission from the subscriber to affirmatively take these actions.

In the illustrated example, the mobile device 15 includes a secure component 600. The secure component 600 (e.g. a secure element or "SE") may be provisioned as a section within the memory 604 or may take the form of a universal integrated circuit card ("UICC") located within the device15. A common example of a UICC implementation of the SE 600 is a subscriber identity module ("SIM"). As discussed above, the SE provides secure storage for various identifiers associated with mobile device 15. The SE typically has a unique identifier and is provisioned for operation of the mobile device 15 in the network 10 by storage of a mobile directory number ("MDN") and/or mobile identification number ("MIN") assigned to the device 15 by the carrier network operator.

The secure component contains applications that use secure keys running inside the secure processor. Although similar to other applications, the applications for the secure processor are sometimes smaller and sometimes referred to as applets 643. In an example, App Checker module 17 may be an applet residing in the SE 600. For example, there may be at least one applet 642 to engage in communications via network 10 to identify and isolate incompatible applications during a platform update.

The mobile device 15 supporting identification and isolation of incompatible applications of the type under consideration here may include a variety of different types of physical user interface elements. For discussion purposes, in the device 15 shown in FIG. 6, the physical user interface elements of device 15 includes a touch screen display 420 (also referred to herein as "touch screen 620" or "display 620"). For output purposes, the touch screen 620 includes a display screen, such as a liquid crystal display (LCD) or the like. For input purposes, touch screen display 620 includes a plurality of touch sensors 622.

A keypad may be implemented in hardware as a physical keyboard of mobile device 15, and keys may correspond to hardware keys of such a keyboard. Alternatively, some or all of the keys 630 (and keyboard) of device 15 may be implemented as "soft keys" of a virtual keyboard graphically represented in an appropriate arrangement via touch screen display 620. The soft keys presented on the touch screen display 620 may allow the user of device 15 to invoke the same user interface functions as with the physical hardware keys for authentication purposes.

In general, touch screen display 620 and touch sensors 622 (and one or more keys 630, if included) are used to provide a textual and graphical user interface for the mobile device 15. In an example, touch screen display 620 provides viewable content to the user at device 15. Touch screen display 620 also enables the user to interact directly with the viewable content provided in the content display area, typically by touching the surface of the screen with a finger or an implement such as a stylus.

As shown in FIG. 6, the mobile device 15 also includes a sense circuit 628 coupled to touch sensors 622 for detecting the occurrence and relative location/position of each touch with respect to a content display area of touch screen display 620. In this example, sense circuit 628 is configured to provide processor 602 with touch-position information based on user input received via touch sensors 622. In some implementations, processor 602 is configured to correlate the touch position information to specific content being displayed within the content display area on touch screen display 620. The touch-position information captured by the sense circuit 628 and provided to processor 602 may include, but is not limited to, coordinates identifying the location of each detected touch with respect to the display area of touch screen display 620 and a timestamp corresponding to each detected touch position.

The information provided by the sense circuit 628 may include, for example, a series of different locations of touch points/positions detected across the content display area of touch screen display 620 over a predetermined period of time. The location and time information for a series of continuous touch points/positions can be used by processor 602 to track the movement of the user's finger(s) (or other input device) across the touch screen display 620. This information also may be used to track various parameters including, but not limited to, the direction and speed of finger movement based on changes between the different touch positions over time. The information tracked by the sense circuit 628 is used by processor 602 to detect various points of touching as well as different types of touch gestures, for enabling the processor and thus the mobile device 15 to perform operations in accordance with each touch or touch gesture.

Figure 7:
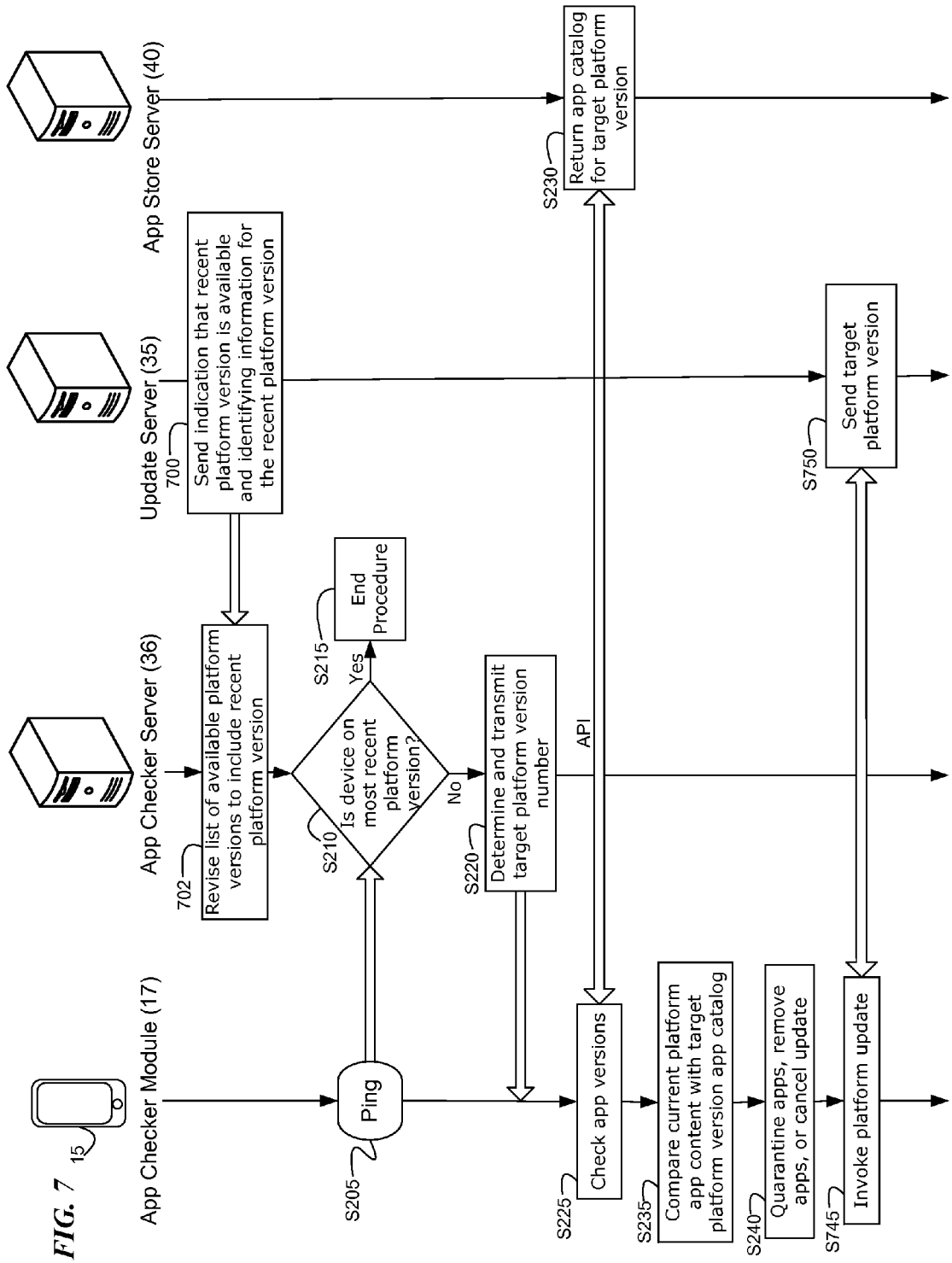
FIG. 7 is a flow chart of a procedure for finding and quarantining incompatible applications during a platform update via an application store, where the App Checker Server is decoupled from the Update Server.

FIG. 7 illustrates a procedural flow for finding and quarantining incompatible applications during a platform update via an application store, where the App Checker Server 36 is decoupled from the Update Server 35. In the illustrated example, the mobile device 15 is in communication with the carrier network 10. In the example of FIG. 7, all of the steps proceed in the same manner as the corresponding numbered steps in FIG. 2 with several exceptions: steps S210, S215, and S220 are handled by the App Checker Server 36 instead of the Update Server 35, The salient points of the example in FIG. 7 occur in newly numbered steps S700, S702, S745, and S750.

In step S700, the Update Server 40 sends an indication to the App Checker Serve 36 that a recent platform version is available. Such an indication may include a platform identifier and the platform version number. A platform identifier is an identifier, such as an alphanumeric string, used to uniquely identify each platform, such as platforms developed by a carrier or an OEM.

Continuing now to step S702, the App Checker Server 40 maintains and revises a platform list for each platform identifier. Each platform version list is updated as a new platform versions become available for the platform identifier. The platform version list includes a list of all the platform version numbers for each platform and information identifying which is the most recent platform version number within the list of platform version numbers.

This platform version list is used in steps S210, S215, and S220, as previously described, to determine whether the mobile device 15 is on the most recent platform version and determine and transmit the target platform version number. In step S210, upon receiving the ping request in S205, the App Checker Server 36 determines whether the mobile device 15 is running the most recent platform version. This can be done by receiving a platform identifier and a platform version number from the App Checker module 17. The platform identifier is used as a key to retrieve a platform version list that is unique to the received platform identifier. The App Checker Server 36 then compares the received platform version number from the App Checker module 17 against the most recent platform version number in the platform version list to determine whether the mobile device 15 is on the most recent platform version. In step S220, the most recent platform version number is then transmitted back to the App Checker 17 module to identify the target platform version number that is available for download via the Update Server 35. In step 745, the App Checker module invokes the platform update by sending a request to the Update Server 35 to download the target platform version number. The request may include the platform identifier and the target platform version. In response to receiving the download request, in step S750, the Update Server 35 responds by sending the target platform version to the mobile device 15.

Aspects of the methods of identifying and isolating incompatible applications during a platform update as outlined above may be embodied in programming, for example, for one or more server and/or for mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the mobile device 15, Update Server 35, and App Store Server 40 so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of the carrier, such as Update Server 35, or alternatively the App Store Server 40, onto the mobile device 15. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device comprising:
a network communication interface configured to provide communications between the mobile device and a network with which the mobile device is connected;
a processor; and
a memory accessible to the processor,
the memory storing:
a software platform,
installed applications, and
Application Checker (App Checker) programming,
the software platform, the installed applications, and the App Checker programming being executable by the processor; and
the processor, when executing the App Checker programming, is to:
send a platform upgrade request through the network communication interface to an Update Server in the network to determine whether a new software platform is available for the mobile device,
the platform upgrade request identifying a current platform version of the software platform in the memory;
receive a response through the network communication interface from the Update Server indicating that the new software platform is available,
the response including a target platform version number identifying a target platform version of the new software platform;
generate a list of the installed applications on the mobile device after receiving the target platform version number from the Update Server,
the list of the installed applications including an application identifier (app ID) and version number of each installed application, of the installed applications;
send a catalog request, through the network communication interface and to an Application Store Server (App Store Server), for an application catalog of compatible applications that are whitelisted relative to the target platform version of the new software platform;
receive, through the network communication interface, the application catalog from the App Store Server based on sending the catalog request to the App Store Server,
the application catalog indicating compatibility status of each installed application, of the installed applications, relative to the target platform version of the new software platform;
iteratively compare the list of the installed applications with the application catalog to identify whether each installed application, of the installed applications, is compatible with the target platform version of the new software platform;
populate an application quarantine or removal database with data indicating each installed incompatible application, of the installed applications, based on iteratively comparing the list of the installed applications with the application catalog, to isolate each installed incompatible application, of the installed applications, found to be incompatible with the target platform version of the new software platform;

quarantine or remove each installed incompatible application, of the installed applications, on the mobile device after populating the application quarantine or removal database;
set a status, of whether a first installed incompatible application, of the installed applications, is affirmatively quarantined or removed, to affirmatively quarantined based on the first installed incompatible application, of the installed applications, being a quarantined application,
the quarantined application being isolated such that the quarantined application is no longer capable of execution on the mobile device;
upgrade the mobile device to the target platform version of the new software platform after quarantining or removing each installed incompatible application of the installed applications;
send, through the network communication interface, a monitoring request to the App Store Server to query whether any quarantined or removed application has become compatible with the target platform version of the new software platform; and
enable the isolated quarantined application based on determining that the isolated quarantined application has become compatible with the target platform version of the new software platform.

2. The mobile device of claim 1, where the processor, when iteratively comparing the list of the installed applications with the application catalog to identify whether each installed application, of the installed applications, is compatible with the target platform version of the new software platform, is to:
search the application catalog for each app ID and version number of each installed application, of the installed applications;
deem a second installed application, of the list of the installed applications, compatible and take no further action based on finding a compatibility status, in the application catalog, for the second installed application, of the list of the installed applications, indicating the second installed application, of the list of the installed applications, is whitelisted; and
deem a third installed application, of the list of the installed application, incompatible and populate the application quarantine or removal database with information identifying the third installed application, of the list of the installed applications, based on finding a compatibility status, in the application catalog, for the third installed application, of the list of the installed applications, indicating the third installed application, of the list of the installed applications, is blacklisted.

3. The mobile device of claim 1, where the processor, when populating the application quarantine or removal database, is to:
store a corresponding app ID and version number of each installed incompatible application, of the installed applications,
store a corresponding status of whether each installed incompatible application, of the installed applications, is affirmatively quarantined or removed, and
store the target platform version number relative to each installed incompatible application, of the installed applications, being affirmatively quarantined or removed.

4. The mobile device of claim 3, where the processor, when populating the application quarantine or removal database, is further to:
set the status, of whether the first installed incompatible application, of the installed applications, is affirmatively quarantined or removed, to affirmatively removed based on the first installed incompatible application, of the installed applications, being a removed application; and reinstall the removed application based on determining that the removed application with the affirmatively removed status has become compatible with the target platform version.

5. The mobile device of claim 1, where the processor, when sending, through the network communication interface, the monitoring request to the App Store Server to query whether any quarantined or removed application has become compatible with the target platform version of the new software platform, is to:

automatically send the monitoring request at a set time interval.

6. The mobile device of claim 5, where the set time interval for sending the monitoring request is one week.

7. The mobile device of claim 1, where the processor, when executing the App Checker programming, is further to:

continually monitor behavior of the installed applications on the target platform version of the new software platform after upgrading the mobile device to the target platform version;

generate a malfunction report based on a first installed application of the installed applications not functioning correctly, the malfunction report including:
an app ID of the first installed application, of the installed applications,
a version number of the first installed application, of the installed applications, and
the target platform version of the new software platform; and transmit, through the network communication interface, the malfunction report to the Update Server.

8. The mobile device of claim 1, where the new software platform includes:

an update to a native application developed by an earner or an original equipment manufacturer; and an update to a mobile device operating system on the mobile device.

9. The mobile device of claim 1, where each installed application, of the installed applications, is a third-party application downloaded from the App Store Server.

10. The mobile device of claim 1, where the processor is further to:

present for display an indication that the isolated quarantined application has become compatible, with the target platform version of the new software platform, based on determining that the isolated quarantined application has become compatible with the target platform version of the new software platform.

11. A method comprising:

sending, by an update server, a message to a mobile device indicating that a new software platform is available,
the message including a target platform version number identifying a target platform version of the new software platform;

receiving, by the update server and from the mobile device, a catalog request for an application catalog on the target platform version of the new software platform based on the message indicating that the new software platform is available,
the catalog request including a list of installed applications on the mobile device,
each installed application, of the installed applications on the list of the installed applications, having a corresponding application ID ("app ID") and a corresponding version number;

querying, by the update server, an application compatibility whitelist and blacklist database, using the corresponding app ID and the corresponding version number of each installed application, of the installed applications, to find a compatibility status with the target platform version of the new software platform based on receiving the catalog request at the Update Server,
the compatibility status indicating whether each installed application, of the installed applications, is whitelisted or blacklisted on the target platform version of the new software platform;

generating, by the update server, the application catalog,
the application catalog including:
each installed application, of the installed applications,
the corresponding app ID and the corresponding version number of each installed application, of the installed applications, and
the compatibility status on the target platform version of the new software platform indicating whether each installed application, of the installed applications, is whitelisted or blacklisted; and sending, by the update server, the application catalog to the mobile device,
the application catalog being sent for quarantining or removing installed blacklisted applications, of the installed applications, before the target platform version of the new software platform is installed,
a status of whether an installed blacklisted application, of the installed blacklisted applications, being set as affirmatively quarantined based on the installed blacklisted application being a quarantined blacklisted application,
the quarantined blacklisted application being isolated such that the quarantined blacklisted application is no longer capable of execution on the mobile device,
the mobile device being upgraded to the target platform version of the new software platform after the installed blacklisted applications being quarantined or removed,
a monitoring request being sent to an App Store Server to query whether any quarantined or removed installed blacklisted application has become compatible with the target platform version of the new software platform, and
the quarantined blacklisted application being enabled, after the mobile device is upgraded to the target platform version of the new software platform, based on the quarantine blacklisted application becoming compatible with the target platform version of the new software platform.

12. The method of claim 11, further comprising:

receiving a platform upgrade request from the mobile device at the Update Server to determine whether the new software platform is available to the mobile device,
the platform upgrade request including a current platform version number identifying a current platform version deployed on the mobile device; and determining whether a more recent software platform is available to the mobile device based on the platform upgrade request; and where sending the message to the mobile device indicating that the new software platform is available comprises:

sending the message to the mobile device indicating that the new software platform is available based on determining that a more recent software platform is available.

13. The method of claim 11, further comprising:
receiving a malfunction report from a different mobile device when a first application that is installed on the different mobile device does not function correctly, the malfunction report designating a first platform version number, identifying:
a first platform version of the new software platform, on which the first application malfunctioned,
a corresponding first app ID, and
a first version number of the first application; and
storing the malfunction report as an entry in a malfunction report database based on receiving the malfunction report.

14. The method of claim 13, further comprising:
updating the application compatibility whitelist and blacklist database by increasing a tally of malfunctions, for the first application on the first platform version of the new software platform, after storing the malfunction report; and
adjusting a compatibility status, for the first application on the first platform version of the new software platform, based on the increased tally of malfunctions.

15. The method of claim 14, where the compatibility status, for the first application on the first platform version of the new software platform, is adjusted to blacklist status when the tally of malfunctions, as a fraction of a total number of installations, of the first application on the first platform version of the new software platform, exceeds a threshold.

16. The method of claim 14, where the compatibility status, for the first application on the first platform version of the new software platform, is adjusted to blacklist status when:
the tally of malfunctions exceeds a first threshold, and
a total number of installations, of the first application on the first platform version of the new software platform, exceeds a second threshold.

17. The method of claim 14, where the compatibility status, for the first application on the first platform version of the new software platform, is adjusted to blacklist status when the tally of malfunctions exceeds a count of malfunctions for the first application on a platform preceding the first platform version of the new software platform.

18. The method of claim 14, where the compatibility status, for the first application on the first platform version of the new software platform, is adjusted to grey list status when the tally of malfunctions is between an upper threshold indicating blacklist status and a lower threshold indicating whitelist status.

19. The method of claim 11, where the application catalog that is generated by the Update Server and sent to the mobile device further indicates a first application, of the installed applications, is greylisted on the target platform version, thereby leaving whether to whitelist or blacklist the first application, of the installed applications, to the mobile device.

20. The method of claim 11, where the catalog request is an Hypertext Transfer Protocol ("HTTP") request.

\* \* \* \* \*